United States Patent
Ito

(10) Patent No.: US 8,032,640 B2
(45) Date of Patent: *Oct. 4, 2011

(54) PVC SWITCHING

(75) Inventor: Hidetaka Ito, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 224 days.

This patent is subject to a terminal disclaimer.

(21) Appl. No.: 12/399,464

(22) Filed: Mar. 6, 2009

(65) Prior Publication Data

US 2009/0168656 A1 Jul. 2, 2009

Related U.S. Application Data

(63) Continuation of application No. 10/038,655, filed on Jan. 8, 2002, now Pat. No. 7,519,712.

(30) Foreign Application Priority Data

Jan. 12, 2001 (JP) ................................. 2001-004350

(51) Int. Cl.
*G06F 15/16* (2006.01)
(52) U.S. Cl. ..... 709/227; 370/216; 370/225; 370/241.1; 370/242
(58) Field of Classification Search .................. None
See application file for complete search history.

(56) References Cited

U.S. PATENT DOCUMENTS

| | | | |
|---|---|---|---|
| 5,905,714 A | 5/1999 | Havansi | |
| 5,974,046 A | 10/1999 | Kim et al. | |
| 6,055,239 A | 4/2000 | Kato | |
| 6,181,680 B1 | 1/2001 | Nagata et al. | |
| 6,259,697 B1 | 7/2001 | Tatsukawa | |
| 6,311,288 B1 | 10/2001 | Heeren et al. | |
| 6,442,132 B1 | 8/2002 | Burns et al. | |
| 6,643,254 B1 | 11/2003 | Kajitani et al. | |
| 6,944,124 B2 | 9/2005 | Ito | |
| 2003/0012133 A1 | 1/2003 | Jappinen | |
| 2003/0137933 A1 | 7/2003 | Yamada et al. | |
| 2005/0018600 A1 | 1/2005 | Tornar | |

FOREIGN PATENT DOCUMENTS

| | | |
|---|---|---|
| JP | 5-235983 | 9/1993 |
| JP | 9-266480 | 10/1997 |
| JP | 10-32590 | 2/1998 |
| JP | 10-303913 | 11/1998 |
| JP | 11-74895 | 3/1999 |
| JP | 11-215148 | 8/1999 |
| JP | 2000-59374 | 2/2000 |
| JP | 2000-69032 | 3/2000 |
| JP | 2000-151634 | 5/2000 |
| JP | 2000-228665 | 8/2000 |

OTHER PUBLICATIONS

U.S. Appl. No. 10/038,655, filed Jan. 8, 2002 entitled "PVC Switching Control Method for ATM Communication Network", Hidetaka Ito, 22 pages.

*Primary Examiner* — Dustin Nguyen
(74) *Attorney, Agent, or Firm* — Harrity & Harrity, LLP

(57) ABSTRACT

The invention provides a PVC switching control method for an ATM communication network which allows high speed changeover of a connection upon occurrence of/release from a trouble and is superior in reliability and maintenance facility and simple in control. A master PVC connection and an OAM connection are set between two ATM exchanges, and a bypassing PVC connection and an OAM connection prepared in advance for bypassing are set between the two ATM exchanges. If occurrence of/release from a trouble with and of the master PVC connection is recognized by the ATM exchanges using an OAM function, then the operative PVC connection is switched between the master PVC connection and the bypassing PVC connection.

20 Claims, 4 Drawing Sheets

(PVC IN NORMAL OPERATION)

(BYPASSING PVC UPON OCCURRENCE OF TROUBLE)

(PVC IN NORMAL OPERATION)

(BYPASSING PVC UPON OCCURRENCE OF TROUBLE)

PVC SWITCHING

This application is a continuation of U.S. application Ser. No. 10/038,655, filed Jan. 8, 2002, now issued as U.S. Pat. No. 7,519,712, the entire contents of which are incorporated herein by reference.

BACKGROUND OF THE INVENTION

1. Field of the Invention

This invention relates to a network management technique, and more particularly to an ATM (Asynchronous Transfer Mode) exchange system and a switching control method for a permanent virtual connection (hereinafter referred to as "PVC connection") for an ATM network.

2. Description of the Related Art

As diversification, increase in speed and increase in capacity of services in an ATM network in recent years proceed, it becomes a significant subject to improve an ATM exchange system in terms of the performance, function and reliability. As a necessary function, it is demanded particularly to augment the reliability of a PVC connection. Specifically, when a trouble occurs with a circuit, it is significant to continue communication of a PVC connection with a minimum cell loss.

As a method of preventing disconnection of a PVC connection by a trouble of a circuit or an apparatus, it is a possible idea to employ a redundant configuration (dual configuration, n+1 multiple configuration) in hardware for a circuit itself. This method, however, is disadvantageous in that it requires complicated maintenance.

As another method, it is known to use a network management system (NMS) to automatically or manually switch, when a trouble occurs with a PVC connection, the PVC connection to another PVC connection of another route (refer to, for example, Japanese Patent Laid-Open No. 2000-59374). With the method, however, when a trouble occurs or upon release from a trouble, it is necessary for the network management system to notify each ATM exchange of setting/deletion of a PVC connection. Therefore, the method has a problem in that considerable time is required for the exchanging process. Further, if a trouble occurs with the network management system, then this makes setting itself of a PVC connection impossible.

Thus, a method has been proposed wherein network management is performed autonomously and discretely without depending upon a network management system. For example, Japanese Patent Laid-Open No. 266480/1997 discloses a method wherein, when a trouble occurs with a circuit, a routing function of a switched virtual connection (SVC) is used to set a bypassing SVC connection.

Meanwhile, Japanese Patent Laid-Open No. 215148/1999 discloses another method wherein both of a PVC connection and an SVC connection are used such that, if a trouble occurs with the PVC, a call setting procedure by the SVC is executed to set an optimum SVC connection as a bypass link.

However, with the conventional autonomous PVC bypassing method, however, when a trouble occurs with a currently used PVC connection, a bypassing SVC connection is searched for and set. Therefore, rapid switching cannot be anticipated. Further, although a bypassing connection is set and switchably used when a trouble occurs with a currently used connection and then the bypassing connection is disconnected and the currently used connection is switchably used upon release of the currently used connection, the conventional autonomous PVC bypassing method does not propose any autonomous countermeasure of software against occurrence of/release from a trouble which may occur with the currently used or bypassing connection.

SUMMARY OF THE INVENTION

An aspect of the present invention is directed to providing a PVC switching control method which allows high speed changeover of a connection upon occurrence of/release from a trouble and is superior in reliability and maintenance facility and simple in control.

According to an aspect of the present invention, there is provided a PVC switching control method for controlling a PVC connection in an ATM communication network, comprising the steps of setting a plurality of PVC connections and individually corresponding controlling connections between two ATM exchanges of the ATM communication network, and detecting, by each of the ATM exchanges, occurrence of and release from a trouble with and of a PVC connection corresponding to any of the controlling connections and switching an operative PVC connection to another one of the PVC connections in response to a result of the detection.

The PVC switching control method may be configured such that, if, while one of the PVC connections is used as the currently used PVC connection, it is detected from the corresponding controlling connection that a trouble has occurred with the PVC connection, then each of the ATM exchanges switches the operative PVC connection to another one of the PVC connections as a bypassing PVC connection. Further, the PVC switching control method may be configured such that, if, while the bypassing PVC connection is used, it is detected that the currently used PVC connection has been released through the corresponding controlling connection, then each of the ATM exchanges switches the operative PVC connection to the currently used PVC connection.

The controlling connections may be set by an operation administration and maintenance (OAM) function. Further, each of the ATM exchanges may detect a trouble through the fact that an alarm indication signal cell of the operation administration and maintenance function is inputted thereto or through the fact that a continuity check cell of the operation administration and maintenance function is not inputted thereto.

According to another aspect of the present invention, there is provided a PVC switching control method for controlling a PVC connection in an ATM communication network, comprising the steps of setting a master PVC connection and a master side operation administration and maintenance connection corresponding to the master PVC connection between a first ATM exchange and a second ATM exchange, setting a bypassing PVC connection prepared in advance for bypassing of the master PVC connection and a bypassing side operation administration and maintenance connection corresponding to the bypassing PVC connection between the first and second ATM exchanges, and switching, if both of the first and second ATM exchanges detect a trouble of the master PVC connection through the master side operation administration and maintenance connection, the PVC connection to the bypassing PVC connection by means of the first and second ATM exchanges.

The PVC switching control method may be configured such that, if, while the first and -second ATM exchanges use the bypassing PVC connection, the first and second ATM exchanges detect a release of the master PVC connection through the master side OAM connection, each of the first and second ATM exchanges switches the PVC connection to the master PVC connection.

The PVC switching control method may be configured such that a plurality of repeating ATM exchanges are connected on a route of the bypassing PVC connection and a connection for forming the bypassing PVC connection is set in each of the repeating ATM exchanges. In this instance, each of the first and second ATM exchanges may designate the connection set in advance and signal an ATM cell to a neighboring one of the plurality of repeating ATM exchanges through the designated connection.

In summary, according to the PVC switching control methods for an ATM communication network, a master PVC connection and an operation administration and maintenance connection corresponding to the PVC connection are set between two ATM exchanges, and a bypassing PVC connection and an operation administration and maintenance connection prepared in advance for bypassing are set between the two ATM exchanges. Occurrence of and release from a trouble with and of the master PVC connection can be detected through the operation administration and maintenance connection, and autonomous and high speed switching between the master PVC connection and the bypassing PVC connection can be achieved. Since such detection and switching as described above do not rely upon control of a network management system, the switching speed of the PVC connection can be augmented, and the cell loss is reduced and the reliability of the PVC connection is augmented.

Also where three or more PVC connections are set between two stations of an ATM communication network, switching between PVC connections and switching back between the PVC connections can be executed by control for a single apparatus. Therefore, the control is simplified. Further, when a trouble occurs with and/or is eliminated from a circuit, a network manager need not perform PVC connection setting again. Therefore, maintenance is facilitated.

The above and other aspects, features and advantages of the present invention will become apparent from the following description and the appended claims, taken in conjunction with the accompanying drawings in which like parts or elements are denoted by like reference symbols.

BRIEF DESCRIPTION OF THE DRAWINGS

FIG. 2 is a block diagram of an ATM network showing a flow of an ATM cell during normal operation of the ATM network shown in FIG. 1a;

FIG. 4 is a flow diagram illustrating a status transition of a PVC switching function of the ATM network configuration of FIG. 1a;

DESCRIPTION OF THE PREFERRED EMBODIMENT

Figure 1A:
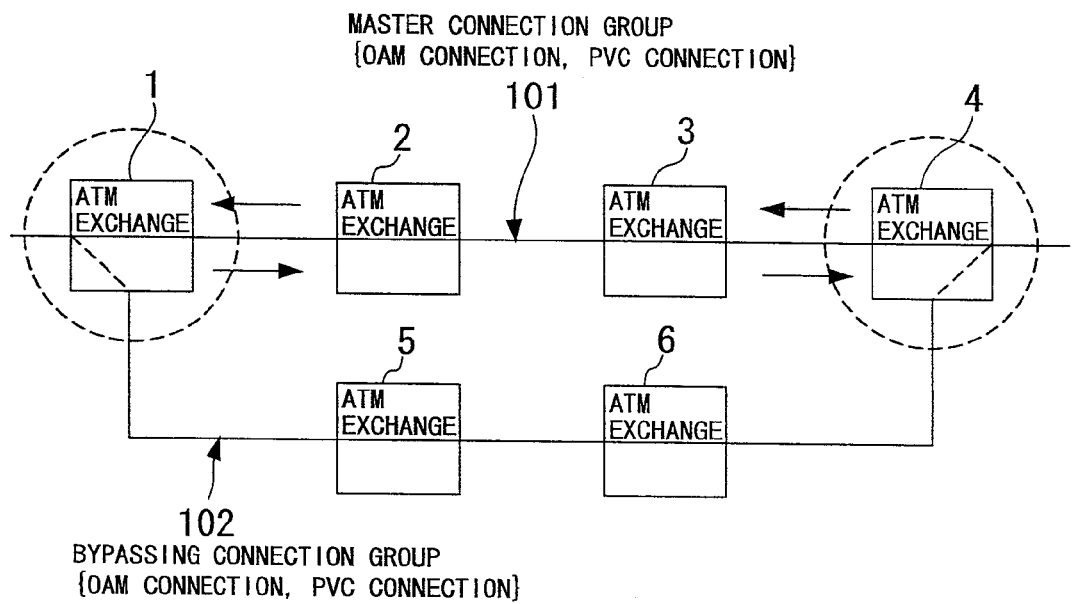
FIG. 1a is a block diagram showing an ATM network configuration to which a PVC switching control method according to the present invention is applied.
Figure 1B:
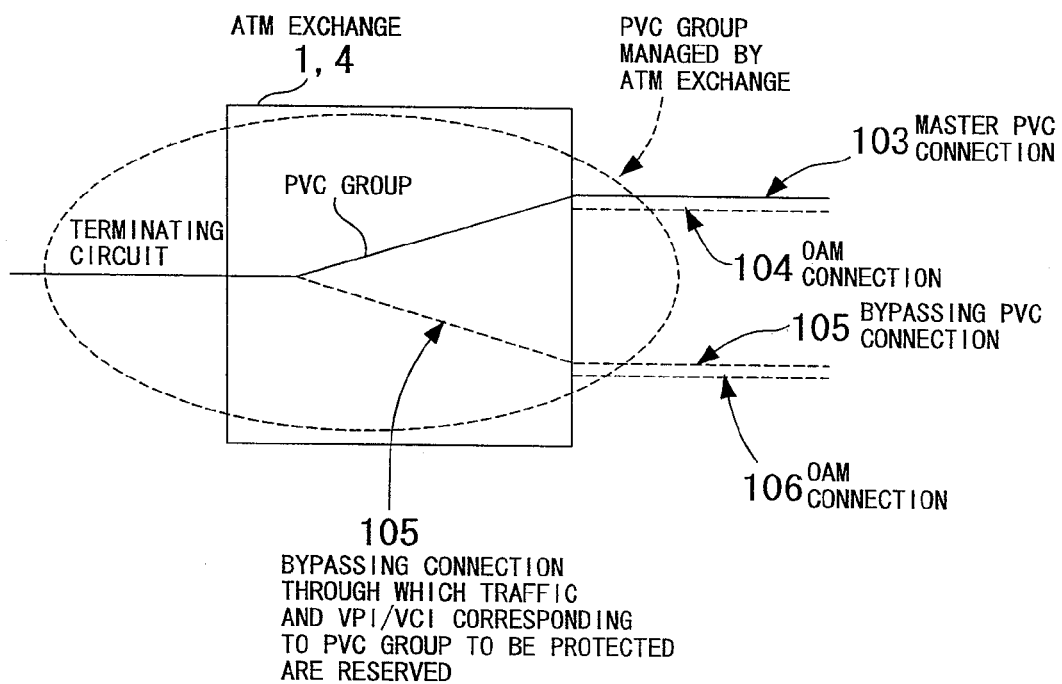
FIG. 1b is a schematic view of an ATM exchange showing a master and bypassing connection group (PVC group) in an ATM exchange at a terminating portion of a PVC connection.

FIG. 1a shows an ATM network configuration to which a PVC switching control method according to the present invention is applied, and FIG. 1b shows an ATM exchange and illustrates a master and bypassing connection group (PVC group) in an ATM exchange at a terminating portion of a PVC connection. The PVC group includes a master PVC connection, a master side OAM connection, a bypassing side PVC connection and a bypassing side OAM connection.

In the present embodiment, in order to simplify description, it is assumed that the ATM network includes ATM exchanges 1 to 6 and currently used and bypassing PVC connections are set between the ATM exchange 1 and the ATM exchange 4. Further, each of the ATM exchanges 1 to 6 is provided with an OAM function and can supervise an AIS (Alarm Indication Signal) cell and/or a CC (Continuity Check) cell.

In particular, a master connection group 101 including a PVC connection 103 and an OAM connection 104 are set bidirectionally in a route from the ATM exchange 1 to the ATM exchange 4 through the ATM exchange 2 and the ATM exchange 3. Further, a bypassing connection group 102 including a PVC connection 105 and an OAM connection 106 is set in another route from the ATM exchange 1 to the ATM exchange 4 through the ATM exchange 5 and the ATM exchange 6 thereby to form a bypass path to be used when a trouble occurs with the master connection.

Referring to FIG. 1b, in each of the ATM exchanges 1 and 4, traffic and VPI/VCI corresponding to a PVC set are reserved in advance. Consequently, when occurrence of/release from a trouble is detected by an OAM connection, PVC switching can be performed immediately.

Each of the ATM exchanges 1 and 4 which are terminations of the master connection group 101 and the bypassing connection group 102, respectively, can utilize an OAM function to detect occurrence of a trouble with a corresponding PVC connection and switch, when a trouble occurs, the PVC connection at a high speed to the other PVC connection. A trouble occurring with a PVC connection can be detected by monitoring an AIS cell and/or a CC cell by the OAM function by means of the ATM exchanges 1 and 4.

In this manner, in the ATM network according to the present embodiment, the connections 104 and 106 for a controlling OAM are extended for the master PVC connection 103 and the bypassing PVC connection 105, respectively. In the following, operation of the ATM network is described.

(Operation)

Figure 2:
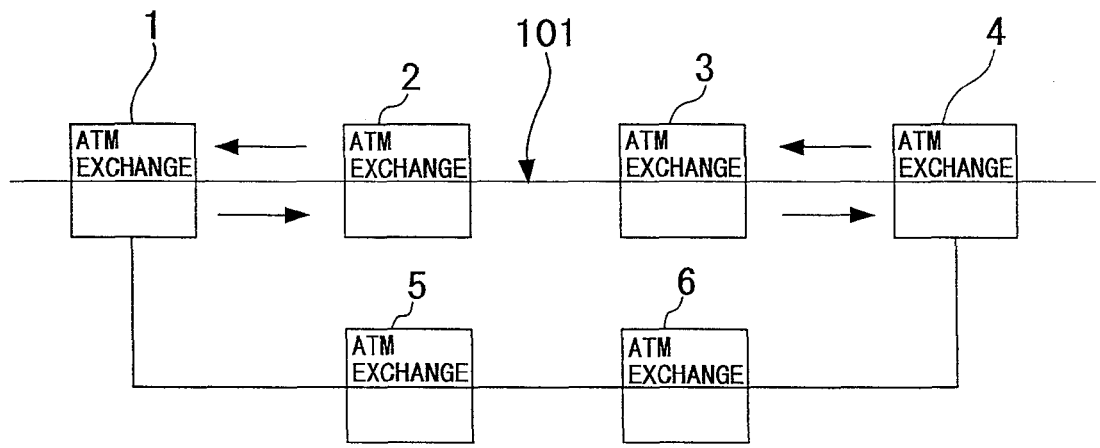

FIG. 2 illustrates a flow of an ATM cell in the ATM network of FIG. 1 when the ATM network operates normally. Referring to FIG. 2, while the network operates normally, the master PVC connection group 101 is used for communication, and the ATM exchange 1 and the ATM exchange 4 supervise to discriminate whether or not an AIS cell is inputted to normally confirm whether or not the master PVC connection 103 is normal. However, it is otherwise possible to supervise for a CC cell of the OAM function to confirm that the PVC connection 103 is normal.

Figure 3:
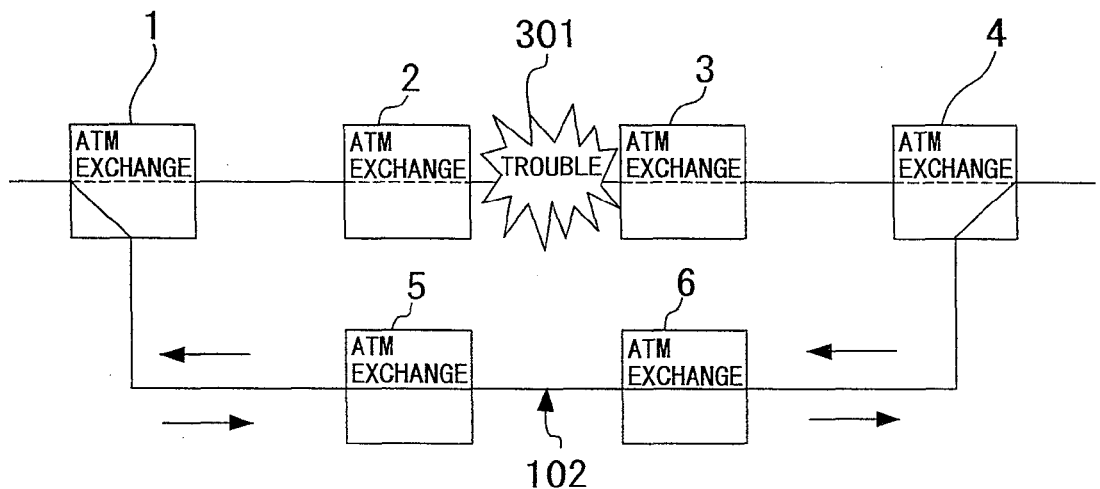
FIG. 3 is a block diagram of the ATM network configuration of FIG. 1a showing a flow of an ATM cell when a trouble occurs with a master PVC connection.

FIG. 3 shows a flow of an ATM cell in the ATM network when a trouble occurs with the master PVC connection. Referring to FIG. 3, if a trouble 301 occurs with a transmission line of the ATM exchanges 2 and 3 on the route of the master PVC connection, then the ATM exchange 1 and the ATM exchange 4 recognize the occurrence of the trouble 301 from an AIS/CC cell of the OAM function and change over the PVC connection from the master PVC connection 103 to the bypass PVC connection 105.

In this manner, even if a trouble occurs with the route of the master PVC connection 103, the PVC communication can be continued without interruption through the bypass PVC connection 105 which bypasses the trouble 301. In this instance, since the OAM connection 106 is extended to the bypass PVC connection 105, similar detection of occurrence of/release from a trouble can be performed.

If the trouble of the master PVC connection is eliminated after the switching to the PVC connection 105, then since the ATM exchange 1 and the ATM exchange 4 can recognize this using the OAM function thereof, the PVC connection can be switched from the bypass PVC connection 105 to the master PVC connection 103 automatically.

Figure 4:
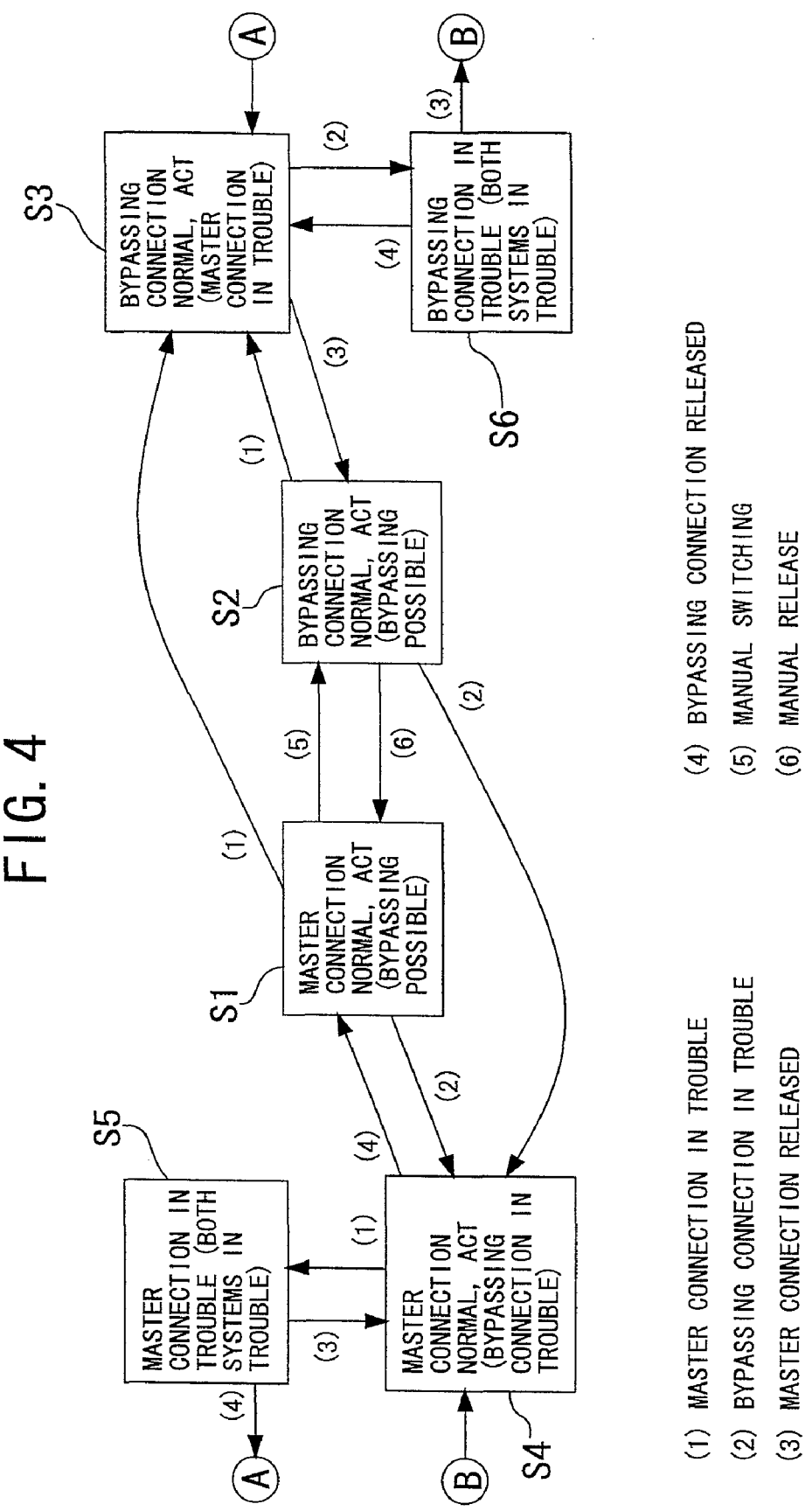

FIG. 4 illustrates a status transition of the PVC switching function of the ATM network. Referring to FIG. 4, reference numerals (1) to (6) represent occasions at which a status transition occurs, and (1) represents a trouble with the master connection, (2) a trouble with the bypassing connection, (3) a release of the master connection, (4) a release of the bypassing connection, (5) manual switching, and (6) manual release.

A [status S1] represents an ordinary state wherein the network is operating normally and the master and bypassing connections are normal while the master connection is currently used. In this state, both of manual switching and automatic switching upon occurrence of a trouble with the master connection are possible.

A [status S2] represents a state wherein both of the master and bypassing connections are normal and the bypassing connection is currently used. In this state, both of manual release and automatic switching upon occurrence of a trouble with the master connection are possible.

A [status S3] represents a state wherein a trouble has occurred with the master connection and the bypassing connection is currently used. Both of manual release and automatic switching upon occurrence of a trouble with the bypassing connection are impossible.

A [status S4] represents a state wherein a trouble has occurred with the bypassing connection and the master connection is currently used. Both of manual switching and automatic switching upon occurrence of a trouble with the master connection are impossible.

A [status S5] represents a state wherein a trouble has occurred also with the master connection which was normal and both of the master and bypassing connections are in trouble. In this state, manual switching is impossible. If the trouble of the bypassing connection is eliminated (occasion (4)), then automatic switching is performed to establish the status S3 wherein the bypassing connection is used. If the master connection is released (occasion (3)), then automatic switching is performed to establish the status S4 wherein the master connection is used.

A [status S6] represents a state wherein a trouble has occurred also with the bypassing connection which was normal and both of the master and bypassing connections are in trouble. In this state, manual release cannot be performed. If the master connection is released (occasion (3)), then automatic switching is performed to establish the status S4 wherein the master connection is used. Also when the trouble of the bypassing connection is eliminated (occasion (4)), automatic switching is performed to establish the status S3 wherein the bypassing connection is used.

In this manner, in the ATM network described above, augmentation of a function of a PVC connection provided by an ATM exchange by software can be anticipated. The following three advantages are anticipated with the present embodiment. (1) Since an NMS need not be used to notify each ATM exchange of setting/deletion of a PVC connection, the changeover speed of a PVC connection is high, and the reliability of the PVC connection is improved. (2) Even where a plurality of PVC connections are set between two ATM exchanges, processes for switching and switching back between PVC connections can be performed by control for a single apparatus and therefore are simplified. (3) Upon occurrence of/release from a trouble with a circuit, the network manager need not perform setting for a PVC connection again.

Figure 5:
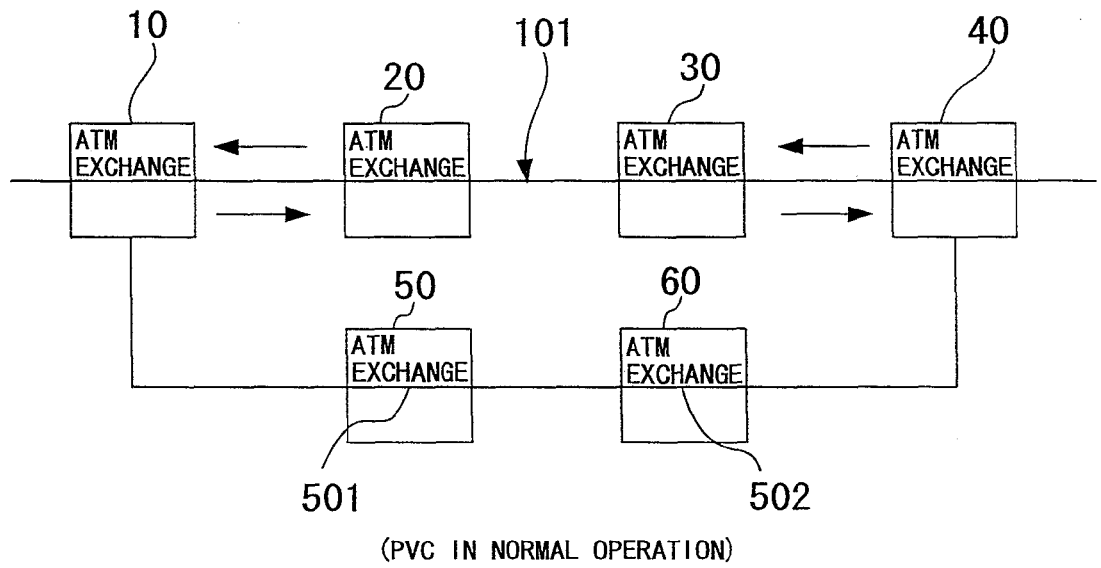
FIG. 5 is a block diagram of another ATM network showing a flow of an ATM cell during normal operation.
Figure 6:
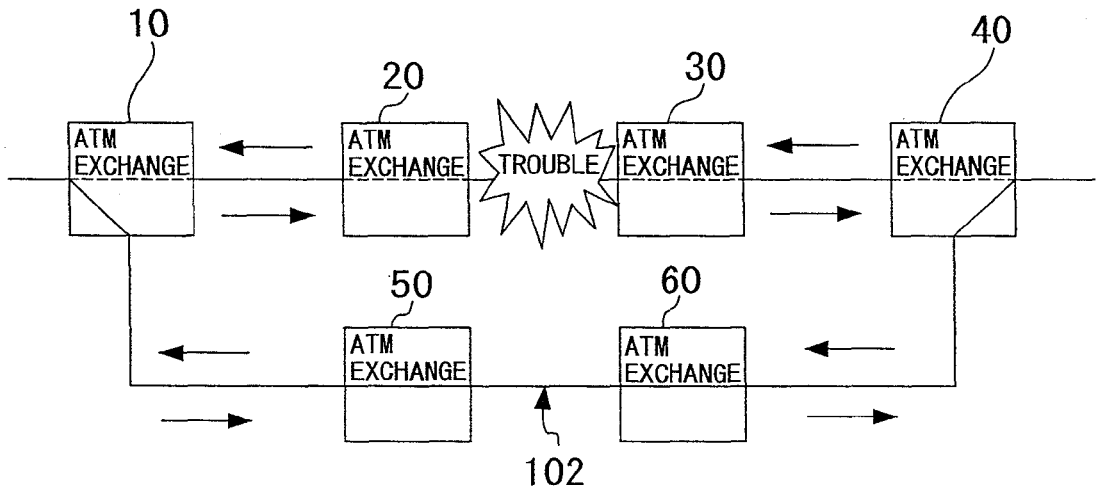
FIG. 6 is a similar view but illustrating a flow of an ATM cell when a trouble occurs with a master PVC connection in the ATM network of FIG. 5.

FIG. 5 shows a configuration of an ATM network and illustrating a flow of an ATM cell in normal operation according to another embodiment of the present invention. FIG. 6 illustrates a flow of an ATM cell when a trouble occurs with a master PVC connection in the ATM network.

In the present embodiment, in order to simplify description, it is assumed that the ATM network includes ATM exchanges 10 to 60 and currently used and bypassing PVC connections are set between the ATM exchange 10 and the ATM exchange 40. Further, similarly as in the first embodiment described hereinabove, each of the ATM exchanges 10 to 60 is provided with an OAM function and can supervise an AIS (Alarm Indication Signal) cell and/or a CC (Continuity Check) cell.

In a normal operation state of the ATM network, bypassing connections 501 and 502 are extended between the ATM exchanges 50 and 60 in the bypass route. More particularly, traffic and VPI/VCI corresponding to the PVC group to be protected are reserved for the bypassing connections 501 and 502 in the ATM exchanges 50 and 60 as seen in FIG. 1b.

If a trouble occurs with the master PVC connection, then the ATM exchanges 10 and 40 switch the PVC connection from the master PVC connection to the bypass PVC connection as described above. In this instance, however, the ATM exchange 10 designates the bypassing connection 501 and transmits an ATM cell to the neighboring ATM exchange 50 through the bypassing connection 501. Similarly, also the ATM exchange 40 designates the bypassing connection 502 and transmits an ATM cell to the neighboring ATM exchange 60 through the bypassing connection 502. Consequently, further rapid PVC switching control can be performed.

It is to be noted that, while, in the embodiments described above, two repeating exchanges are involved, the foregoing description similarly applies also where three or more repeating exchanges are involved.

While preferred embodiments of the present invention have been described using specific terms, such description is for illustrative purposes only, and it is to be understood that changes and variations may be made without departing from the spirit or scope of the following claims.

What is claimed is:

1. A system comprising:
one or more first network devices to provide a master connection group, where the master connection group comprises:
a first permanent virtual connection (PVC) connection and a first operation administration and maintenance connection, corresponding to the first PVC connection, set between a first exchange and a second exchange; and
one or more second network devices to provide a bypassing connection group, where the bypassing connection group comprises:
a second PVC connection and a second operation administration and maintenance connection, corresponding to the second PVC connection, set between the first exchange and the second exchange,
where at least one of the first exchange or the second exchange monitors an alarm indication signal cell to detect trouble with at least one of the first PVC connection or the second PVC connection, and where data is transmitted using one of the first PVC connection or the second PVC connection when the trouble is detected.

2. The system of claim 1, where the first PVC connection and the first operation administration and maintenance connection form a master path, and the second PVC connection and the second operation administration and maintenance connection form a bypass path used in response to detecting trouble with a master path.

3. The system of claim 1, where the first exchange is provided at a terminating portion of the master connection group, and the second exchange is provided at a terminating portion of the bypassing connection group.

4. The system of claim 1, where the first exchange is provided with a first operation administration and maintenance function, and the second exchange is provided with a second operation administration and maintenance function.

5. The system of claim 4, where the first exchange utilizes the first operation administration and maintenance function to detect occurrence of or release from trouble with the first PVC connection and the second exchange utilizes the second operation administration and maintenance function to detect occurrence of or release from trouble with the second PVC connection.

6. The system of claim 1, where at least one of the first exchange or the second exchange further monitors a continuity check cell to detect trouble with at least one of the first PVC connection or the second PVC connection.

7. The system of claim 1, where at least one of the first exchange or the second exchange is an asynchronous transfer mode (ATM) exchange.

8. A method comprising:
setting, by a network device, a first permanent virtual connection (PVC) connection and a first operation administration and maintenance connection, corresponding to the first PVC connection, bidirectionally, between a first exchange and a second exchange, the first PVC connection and the first operation administration and maintenance connection forming a master connection group;
setting, by the network device, a second PVC connection and a second operation administration and maintenance connection, corresponding to the second PVC connection, between the first exchange and the second exchange, the second PVC connection and the second operation administration and maintenance connection forming a bypassing connection group;
monitoring, by the network device, at least one of a continuity check cell or an alarm indication signal via at least one of the first exchange or second exchange to detect trouble with at least one of the first PVC connection or the second PVC connection; and
transmitting, by the network device, data via one of the first PVC connection or the second PVC connection when the trouble is detected.

9. The method of claim 8, where setting a first PVC connection and a second operation administration and maintenance connection comprises forming a master path, and
where setting a second PVC connection and a second operation administration and maintenance connection comprises forming a bypass path used in response to detecting trouble with the master path.

10. The method of claim 8, further comprising:
providing the first exchange at a terminating portion of the master connection group; and
providing the second exchange at a terminating portion of the bypassing connection group.

11. The method of claim 8, further comprising:
providing the first exchange with a first operation administration and maintenance function; and
providing the second exchange with a second operation administration and maintenance function.

12. The method of claim 11, further comprising:
detecting occurrence of or release from trouble with the first PVC connection via the first operation administration and maintenance function of the first exchange; and
detecting occurrence of or release from trouble with the second PVC connection via the second operation administration and maintenance function of the second exchange.

13. The method of claim 8, further comprising:
reserving, in advance, for one of the first PVC connection or the second PVC connection, a virtual path identifier/virtual channel identifier (VPI/VCI) corresponding to one of the master connection group or the bypassing group to be protected,
where reserving the VPI/VCI comprises:
reserving in advance, for the first PVC connection, a VPI/VCI corresponding to the bypassing connection group.

14. The method of claim 8, where at least one of the first exchange or the second exchange is an asynchronous transfer mode (ATM) exchange.

15. A system for setting permanent virtual connection (PVC) connections in a network including a plurality of exchanges, comprising:
one or more network devices to:
set a first PVC connection and a first operation administration and maintenance connection, corresponding to the first PVC connection, bidirectionally, between a first exchange and a second exchange of the plurality of exchanges, the first PVC connection and the first operation administration and maintenance connection forming a master connection group;
set a second PVC connection and a second operation administration and maintenance connection, corresponding to the second PVC connection, between the first exchange and the second exchange, the second PVC connection and the second operation administration and maintenance connection forming a bypassing connection group,
where the bypassing connection group traverses a different set of the plurality of exchanges than the master connection group;
monitor a signal via at least one of the first exchange or the second exchange to detect trouble with at least one of the first PVC connection or the second PVC connection; and
transmit data via one of the first PVC connection or the second PVC connection when the trouble is detected.

16. The system of claim 15, where, when monitoring the signal, the one or more network devices are further to:
monitor at least one of a continuity check cell or an alarm indication signal via at least one of the first exchange or the second exchange to detect the trouble with at least one of the first PVC connection or the second PVC connection.

17. The system of claim 16, where the one or more network devices are further to:
discriminate receipt of the alarm indication signal or failure to receive the continuity check cell to determine whether at least one of the first PVC connection or the second PVC connection is normal.

18. The system of claim 15, where the one or more network devices are further to:

provide the first exchange at a terminating portion of the master connection group; and provide the second exchange at a terminating portion of the bypassing connection group.

19. The system of claim 15, where the one or more network devices are further to:

provide the first exchange with a first operation administration and maintenance function; and provide the second exchange with a second operation administration and maintenance function.

20. The system of claim 19, where the one or more network devices are further to:

detect occurrence of or release from trouble with a first PVC connection, corresponding to the first exchange, via the first operation administration and maintenance function of the first exchange; and detect occurrence of or release from trouble with a second PVC connection, corresponding to the second exchange, via the second operation administration and maintenance function of the second exchange.

* * * * *